United States Patent [19]

Rigan et al.

[11] Patent Number: 5,139,418
[45] Date of Patent: Aug. 18, 1992

[54] DEVICE FOR DISCHARGING AND TRANSFERRING STEELWORKS PRODUCTS

[75] Inventors: Jean-Louis Rigan, Evry; Michel Rostan, Coignieres, both of France

[73] Assignee: Stein Heurtey, Ris Orangis, France

[21] Appl. No.: 666,011

[22] Filed: Mar. 7, 1991

[30] Foreign Application Priority Data

Mar. 13, 1990 [FR] France ............... 90 03178

[51] Int. Cl.⁵ .............................................. F27B 9/14
[52] U.S. Cl. ............................... 432/122; 432/126; 432/234; 414/156; 198/774.1
[58] Field of Search ............ 432/77, 122, 123, 3, 432/126, 234; 414/156; 198/774.1

[56] References Cited

U.S. PATENT DOCUMENTS

| | | | |
|---|---|---|---|
| 3,512,628 | 5/1970 | Keough | 432/121 |
| 3,749,550 | 7/1973 | Suydam | 432/122 |
| 3,792,965 | 2/1974 | Bengtsson | 432/121 |
| 3,887,064 | 6/1975 | Brockmann | 432/122 |
| 4,025,298 | 5/1977 | Tokitsu | 432/122 |
| 4,330,262 | 5/1982 | Kranzl et al. | 432/3 |
| 4,723,909 | 2/1988 | Rouvet | 432/124 |
| 4,820,150 | 4/1989 | Ushijima | 432/122 |
| 4,828,489 | 5/1989 | Albonetti | 432/122 |

FOREIGN PATENT DOCUMENTS

| | | |
|---|---|---|
| 59036 | 9/1982 | European Pat. Off. . |
| 62697 | 10/1982 | European Pat. Off. . |
| 2402782 | 7/1974 | Fed. Rep. of Germany . |
| 2556721 | 12/1977 | Fed. Rep. of Germany . |

*Primary Examiner*—Henry C. Yuen
*Attorney, Agent, or Firm*—Pollock, VandeSande & Priddy

[57] ABSTRACT

Independent installation for discharging, storing and transferring products, such as steelworks products, which comprises fixed beams on which rest the products to be handled, and moveable beams placed between the fixed beams and driven in a rectangular cycle of displacement, each moveable beam comprises, at one of its ends, a discharging arm or fingers so that when a product taken from among those stored on the fixed beams is being transferred, said product rests on the end of said fingers and can be displaced and transferred to a discharging or removal zone in a manner entirely independent of the products which remain stored on said fixed beams.

6 Claims, 3 Drawing Sheets

DEVICE FOR DISCHARGING AND TRANSFERRING STEELWORKS PRODUCTS

FIELD OF THE INVENTION

The present invention relates to an independent installation designed so as to discharge, store and transfer products such as steelwork products, in particular of the slab, thin slab and billet type, the temperature of which can reach a value of the order of 800° C. Such an installation can be used, in particular, for charging products into a soaking chamber, it is also possible for the installation to permit the translational movement of the charge into said chamber and the discharging of the products one by one.

BACKGROUND OF THE INVENTION

There currently exists devices enabling the various functions mentioned above to be performed separately. The present invention is based on the object of designing and providing a single and independent installation, making it possible to perform all these functions.

SUMMARY OF THE INVENTION

The subject of the present invention is consequently an independent installation intended, in particular, for discharging, storing and transferring products, in particular steelwork products, which comprises fixed beams on which rest the products to be handled, and moveable beams placed between the fixed beams and driven in a rectangular cycle of displacement, this installation being defined in that each moveable beam comprises, at one of its ends, a discharging arm or fingers so that when a product taken from among those stored on the fixed beams is being transferred, said product rests on the end of said fingers and can be displaced and transferred to a discharging or removal zone in a manner entirely independent of the products which remain stored on said fixed beams.

According to another embodiment of the installation which is the subject of the invention, the moveable beams also comprise, at their other end, a handling arm or fingers so as to be able to take hold of one or more products situated on supply means and to deposit them subsequently on said fixed beams. According to a preferred embodiment of the invention, the handling fingers are at the same level as the discharging fingers. However, it is possible to position the handling fingers at a different level to that at which the discharging fingers are situated so that the operation of handling the products is made independent of the operation of discharging these products.

Other features and advantages of the present invention will emerge from the description below made with reference to the attached drawings which illustrate illustrative embodiments thereof, given as a guide and with no limiting character.

DETAILED DESCRIPTION OF THE PRESENT INVENTION

Figure 1:
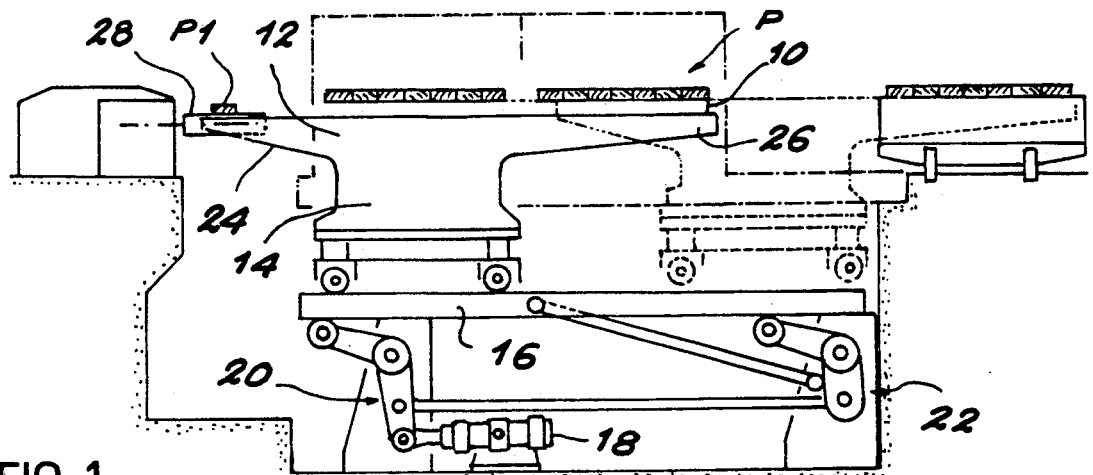
FIG. 1 is an overall view in lateral elevation showing an illustrative embodiment of an installation according to the present invention.
Figure 2:
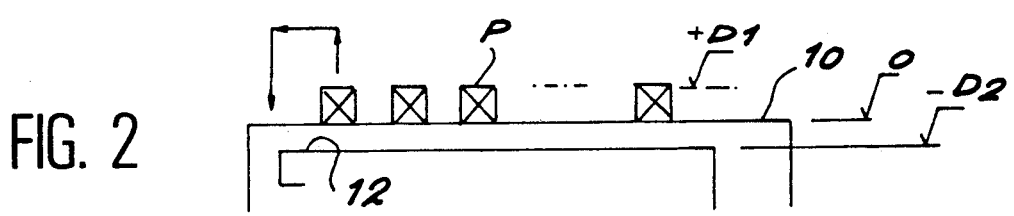
FIGS. 2 and 3 are diagrammatic and partial views, in lateral elevation and in plan respectively, of the installation which is the subject of the invention.
Figure 3:
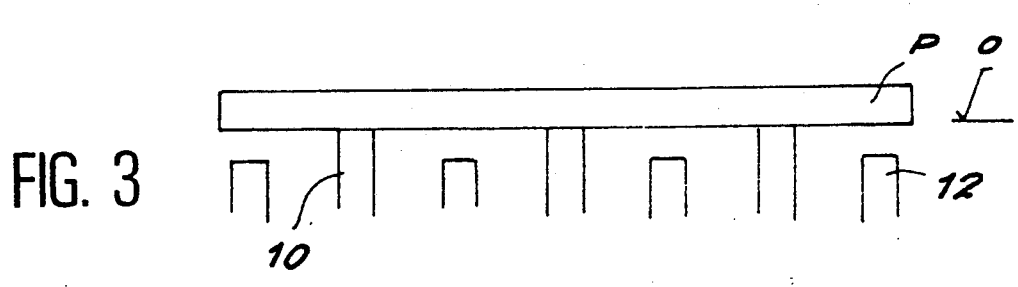

Reference will first be made to FIGS. 1 to 3 which show, by way of non-limiting example, an embodiment of the installation according to the invention.

This installation comprises fixed beams, each designated by the reference 10, which are situated at a level which, in the description below, will be the reference level or level 0. Moveable beams, each designated by the reference 12, are arranged between the fixed beams 10, as can be seen in FIG. 3. These moveable beams 12 are driven with a displacement in a rectangular. cycle which comprises the following operations:

- a vertical rising movement moving them from the level $-D2$ to the level $+D1$;
- a horizontal level displacement at the level $+D1$;
- a vertical descending movement from the level $+D1$ to the level $-D2$; and
- a return to the starting point by a horizontal translational movement at the level $-D2$.

As will be seen in the description of the operation of the installation given below, the succession of successive displacements mentioned above of the moveable beams 12 relative to the fixed beams 10 supporting the products P to be handled causes the series of products resting on the fixed beams (see FIG. 2) to be raised, displaced horizontally in one or other direction and then deposited again on the fixed beams.

The moveable beams 12 are mounted on a support carriage 14, the wheels of which can be displaced horizontally on a running track carried by a moveable frame 16. It is possible for the displacement of the moveable carriage 14 (FIG. 1) to be obtained using any conventional means, for example jacks, rack-and-pinion systems and the like. The moveable frame 16 can be displaced in a vertical translational movement by means of a system of rollers on inclined ramps or, as in FIG. 1, by means of a jack 18 and articulated connecting rods 22. These are conventional arrangements well known to a person skilled in the art and the functioning of which can be clearly seen upon examination of FIG. 1 and therefore will not be described in detail.

According to a feature of the present invention, each moveable beam 12 comprises, at one of its ends, at least one arm or fingers such as 24. In the description which follows, these fingers 24 will be termed discharging fingers. These fingers are constructed in such a way that, when a product taken from those which are stored on the fixed beams 10 is being transferred, this product can rest on the end of said fingers 24, and that it can be displaced and transferred toward discharging means in a manner totally independent of the products P stored on the fixed beams 10. In the illustrative embodiment illustrated in FIG. 1, the means for removing the products separated in this way and handled by the fingers of the moveable beams of the installation according to the invention have been shown in the form of a roller table or discharging means 28 of conventional type.

In the particular illustrative embodiment illustrated by FIG. 1, the moveable beams 12 also comprise fingers 26 which are situated at their end opposite the fingers 24, these fingers 26, the function of which will be explained below, then being designated handling fingers.

The operation of a first illustrative embodiment of an installation according to the present invention will now be described, in which the moveable beams 12 comprise only discharging fingers 24. For this, reference will be made to FIGS. 4 to 10 which illustrate the various successive stages of this example of operation.

Figure 4:
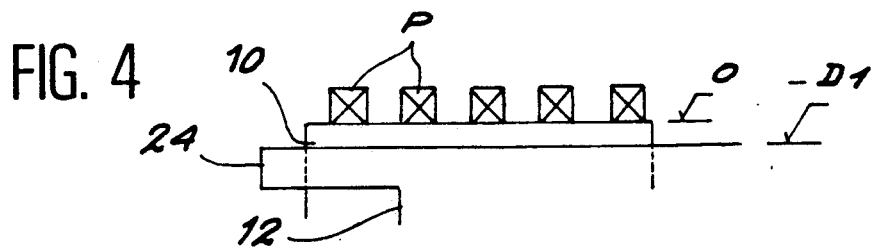
FIGS. 4 to 10 are diagrammatic views similar to FIG. 2 illustrating the various stages of an example of implementation of an installation according to the invention.
Figure 5:
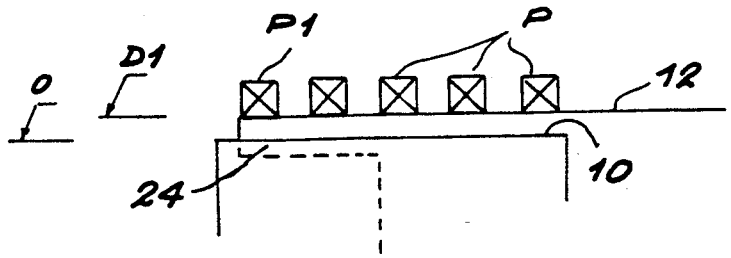
Figure 6:
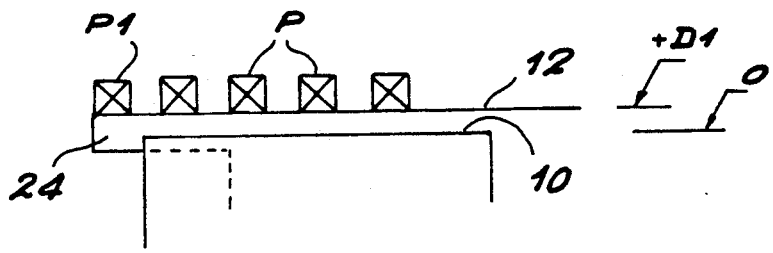

At the beginning of the cycle, in other words in the position illustrated in FIG. 4, the moveable beams 12 are positioned at a standstill at the level −D1, in other words beneath the level of the series of products P which rests on the fixed beams preferably at the level 0. The horizontal displacement of the moveable beams 12 is then brought about so that the latter are positioned in such a way that the discharging fingers 24 are situated immediately beneath the first product P1, in other words the product situated on the far left in the series of products P resting on the fixed beams 10. The raising of all the moveable beams 12 is then brought about (FIG. 5) so as t the whole series of products P which is thus brought to the level +D1.

The moveable beams are then displaced in a horizontal translational movement at the level +D1 (FIG. 6) until the rear face of the first product P1 overhangs the end of the fixed beams 10, this product P1 resting on the end of the discharging fingers 24 of the moveable beams 12.

Figure 7:
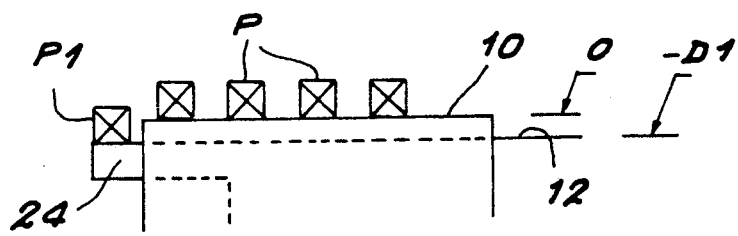

The descending movement of all the moveable beams 12 is then brought about so as to bring them to the level −D1 (FIG. 7). During this downward displacement, the first product P1 is caused to be separated from the series of products P resting on the fixed beams 10, given that this product P1 rests on the end of the discharging fingers 24, beyond the perpendicular of the end of the fixed beams 10. This separating operation, which makes it possible to bring the first product P1 to the level −D1, whereas all the other products P of the series remain at the level 0 on the fixed beams 10, can be seen clearly in FIG. 7. At the end of this stage of the operating cycle, a product P1 has thus been isolated which must now be removed toward discharging means such as the roller table 28 shown in FIG. 1.

Figure 8:
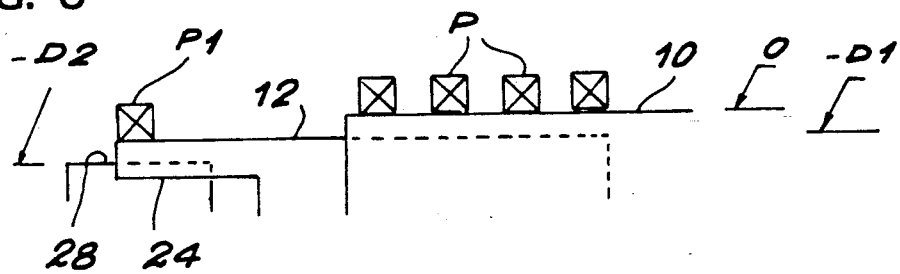

During the following stage illustrated in FIG. 8, the moveable beams 12 are displaced toward the left of the drawing in a horizontal translational movement at the level −D1 so as to bring the product P1 isolated from the series P above the discharging means 28 (deposit or removal zone). It will be noted that this operation takes place entirely independently of the series of products P which remain stationary on the fixed beams 10 at the level 0.

Figure 9:
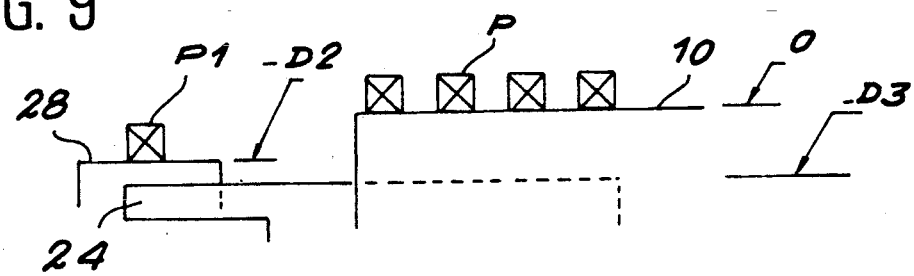
Figure 10:
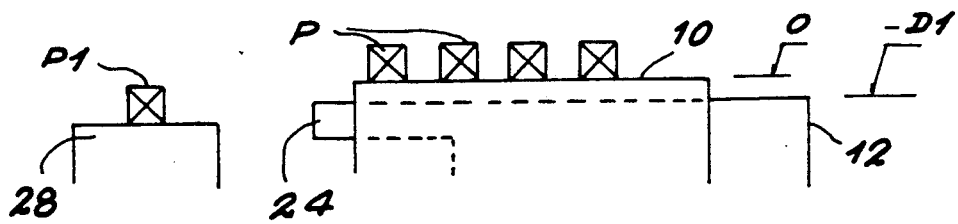

The descending displacement of all the moveable beams 12 is then brought about so as to bring them to the level −D2, which makes it possible to deposit the product P1 on the discharging means 28, the descending movement being continued until all the moveable beams 12 reach the level −D3 (FIG. 9). At the end of this operating cycle, the product P1 has thus been discharged which was isolated beforehand from the series of products P resting on the fixed beams 10. The other products of this series remain, of course, on the fixed beams at the level 0.

Then (FIG. 10), all that remains is to cause the rearward translational displacement of the moveable beams 12 in a horizontal translational movement from left to right in the drawing, and then to cause an upward displacement of these moveable beams 12 so as to bring them to the level D1. This places these moveable beams in the position illustrated in FIG. 4 which corresponds to the starting point of the operating cycle which has just been described. A new cycle can then begin again.

It is possible to envision numerous examples of application of the installation described above. Some of them will be given below, it should be understood that this description is in no way limiting.

Figure 11:
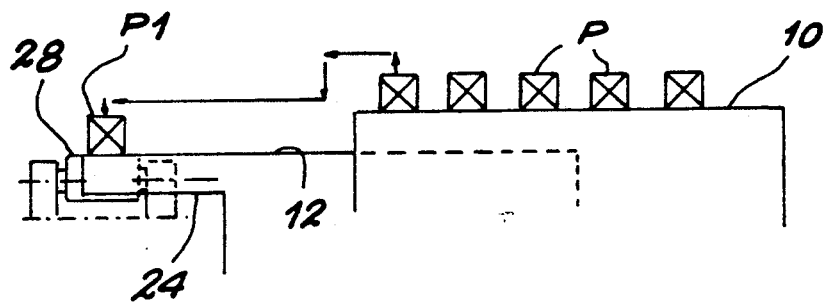
FIG. 11 is also a diagrammatic view similar to FIG. 2 illustrating a first example of application of the installation according to the invention.

FIG. 11 illustrates a first example of application, the operating cycle of which is that described above with reference to FIGS. 4 to 10. In this application, the products are deposited on the fixed beams 10, the moveable beams 12 take hold of them one by one by virtue of the presence of the discharging arm or fingers 24 so as to separate them and subsequently deposit them on the discharging means 28. Thus, in this example of application, the following functions are performed:

gradual advancement of the series of products P on the fixed beams 10 so as to leave the charging-/depositing zone behind this series free;

separation of the product P1 which is situated at the end of the series P and which has been positioned on the discharging fingers 24 provided at the end of the moveable beams 12; and independent displacement of each of the products separated in this way to an appropriate discharging zone such as the roller table 28 of the embodiment illustrated in FIGS. 1 and 11.

Figure 12:
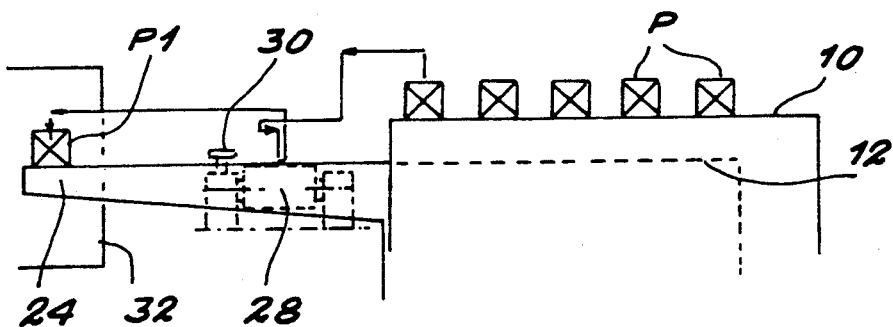
FIG. 12 is a diagrammatic view similar to FIG. 11 illustrating an alternative form of the application illustrated in this FIG. 11.

FIG. 12 illustrates a second example of application of the installation which is the subject of the invention, and it constitutes a development of the mode of application illustrated in FIG. 11. In this second example of application, the product P1 which has been isolated and separated from the series of products P resting on the fixed beams 10 (in the manner described above) is displaced by the moveable beams 12 so as to be applied against a retractable stop 30, so centering it. It can be deposited onto the discharging means 28 in order, for example, to be centered and is then again taken hold of by the moveable beams 12 by means of the discharging fingers 24 which position it inside a chamber 32 consisting, for example, of a reheating or heat-treatment furnace: it may, in particular, be a soaking chamber. Thus, in this example of application, the independent installation which is the subject of the present invention performs all the functions of storing the products, isolation and removal of the products taken one by one from the series resting on the fixed beams, alignment of each product taken up and charging of the latter into the treatment chamber 32.

Figure 13:
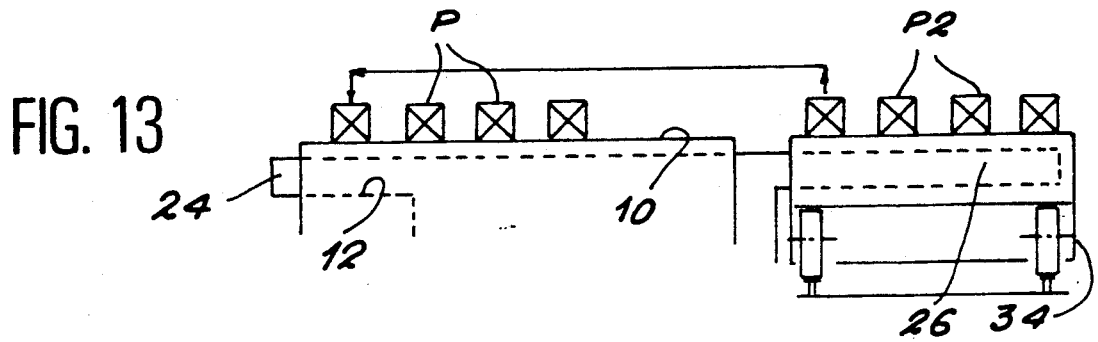
FIG. 13 is also a diagrammatic view similar to FIG. 11 illustrating another example of application of the installation which is the subject of the present invention.

FIG. 13 illustrates an alternative form of the installation which is the subject of the present invention. In this alternative form, the moveable beams 12 also comprise fingers at their other end opposite their end equipped with the discharging fingers 24. This alternative form therefore corresponds to the embodiment described above with reference to FIG. 1 and therefore also comprises handling fingers 26 situated at the righthand end of the moveable beams. These fingers 26 make it possible to take hold, on the side opposite the discharging (the side on which the discharging means 28 is situated in FIGS. 11 and 12), of one or more products such as P2 which are brought onto a supply means which can consist of a carriage such as 34, or alternatively of a roller table.

In the illustrative embodiment illustrated in FIG. 13, the upper plane of the discharging fingers 24 is at the same horizontal level as that of the handling fingers 26. However, it is also possible, in an alternative form of the invention, to offset, for example the discharging fingers 24, upwards, which makes it possible to render the operations of handling and discharging the products independent. In other words, it is possible to discharge a supply carriage such as 34 while some products P remain on the fixed beams 10.

Where the installation described above is intended to handle, store and discharge steelwork products, in particular slabs, thin slabs and billets which may be at a high temperature, for example of the order of 800° C., it is possible to envision, preferably, two solutions in terms of the choice of materials for the beams of the installation, and more particularly for the construction of the fingers of the moveable beams:

either to use refractory steels which are not subject to the sigma phase;

or to use conventional steels, then providing means for cooling, for example with water.

Among the advantages provided by the installation described above, the following may be mentioned in particular:

a single installation which is simple and relatively inexpensive to construct allows a plurality of functions to be performed which were hitherto performed separately by a plurality of machines;

the cycle depositing the product P1 isolated from the series of products P resting on the fixed beams is independent of the translational travel of this series of products: each product of the series can advance by one storage step at a time, and the products separated can be deposited at a substantial distance, for example of the order of several meters, from the fixed beams;

the installation can charge itself using any conventional means provided for this purpose, in particular using a supply carriage or a roller table.

It emerges clearly from the description above that the invention effectively provides an independent installation or unit for discharging, storing and separating products which makes it possible to obtain a one-by-one supply of the products and their depositing, all these operations being carried out by a single machine.

The present invention is not, of course, limited to the illustrative embodiments and examples of application described and mentioned here and, on the contrary, encompasses all alternative forms.

We claim:

1. An apparatus for loading and unloading articles, comprising:

a plurality of fixed parallel spaced beams having discharge and loading ends, the beams serving to support conveyed articles;

a plurality of parallel spaced moveable beams positioned between corresponding fixed beams;

means for driving the moveable beams in a generally rectangular cycle;

each of the moveable beams having a first integral finger shaped end for contacting at least one article positioned at a discharge end of the fixed beams; and a separate receiving surface, adjacent the discharge ends of the fixed beams, upon which an article to be discharged is unloaded, as the finger shaped ends of the moveable beams descend below an upper surface of the fixed beams.

2. The apparatus set forth in claim 1 wherein each of the moveable beams has a second integral finger shaped end for contacting at least one article positioned on a separate loading surface adjacent the loading end of the fixed beams when the second finger shaped end ascends above an upper surface of the fixed beams, and depositing the article on the loading end of the fixed beams for conveyance to the discharge end.

3. The apparatus set forth in claim 2 wherein the first and second finger ends of the fixed beams are level thereby achieving loading and discharging at substantially the same time.

4. The apparatus set forth in claim 2 wherein the first and second finger ends of the fixed beams are at different levels thereby achieving independent loading and discharging.

5. An apparatus for handling steelwork articles comprising:

a plurality of fixed parallel spaced beams having discharge and loading ends, the beams serving to support conveyed articles;

a plurality of parallel spaced moveable beams positioned between corresponding fixed beams;

means for driving the moveable beams in a generally rectangular cycle;

each of the moveable beams having a first integral steel finger shaped end for contacting at least one article positioned at a discharge end of the fixed beams;

a separate receiving surface, adjacent the discharge ends of the fixed beams, upon which an article to be discharged is unloaded, as the finger shaped ends of the moveable beams descend below an upper surface of the fixed beams;

each of the moveable beams having a second integral finger shaped end for contacting at least one article positioned on a separate loading surface adjacent the loading end of the fixed beams when the second finger shaped end ascends above an upper surface of the fixed beams, and depositing the article on the loading end of the fixed beams for conveyance to the discharge end.

6. The apparatus set forth in claim 5 together with means located adjacent the discharge end for centering a discharging article prior to its introduction to a heat treatment chamber.

* * * * *